United States Patent
Vijayakumar

(10) Patent No.: US 8,922,097 B2
(45) Date of Patent: Dec. 30, 2014

(54) PROCESS OF GENERATING POWER FROM HARD DISK VIBRATION IN DATA CENTERS

(75) Inventor: Senthilkumar Vijayakumar, Bangalore (IN)

(73) Assignee: Tata Consultancy Services Limited, Maharashtra (IN)

( * ) Notice: Subject to any disclaimer, the term of this patent is extended or adjusted under 35 U.S.C. 154(b) by 500 days.

(21) Appl. No.: 13/236,044

(22) Filed: Sep. 19, 2011

(65) Prior Publication Data

US 2013/0069486 A1   Mar. 21, 2013

(51) Int. Cl.
*H01L 41/113* (2006.01)
*H02N 2/18* (2006.01)

(52) U.S. Cl.
CPC ..................... *H02N 2/186* (2013.01)
USPC .......................... 310/339; 310/338

(58) Field of Classification Search
USPC ................................. 310/338, 339
See application file for complete search history.

(56) References Cited

U.S. PATENT DOCUMENTS 5,673,304 A * 9/1997 Connor et al. ................ 379/45
7,834,527 B2 * 11/2010 Alvarez Icaza Rivera et al. ............................. 310/344

* cited by examiner

*Primary Examiner* — Thomas Dougherty
(74) *Attorney, Agent, or Firm* — Oliff PLC

(57) ABSTRACT

The present invention relates to an energy harvesting apparatus capable of converting small magnitude low frequency vibrational energy into useful electrical energy that may be stored and used to power microelectronic devices and rechargeable battery technologies. The energy harvesting apparatus utilizes a piezoelectric device coupled to a pneumatic controller for modulating the vibrational energy received from vibrational energy source into a useful alternating energy waveform. A rectifier is further coupled to the piezoelectric device for converting alternating electrical energy to direct current energy for supporting associated external circuitry.

14 Claims, 5 Drawing Sheets

PROCESS OF GENERATING POWER FROM HARD DISK VIBRATION IN DATA CENTERS

FIELD OF THE INVENTION

The present invention generally relates to a method of harvesting small mechanical movements, such as vibrations and converting it to electrical energy, and more particularly for providing harvested energy to external circuitry from piezoelectric sensor array arrangement.

BACKGROUND OF THE INVENTION

Small mechanical movements produced during hard disk vibrations can be a promising source of electrical energy that can be harvested and eventually stored for utilization by other associated electronic devices. The selection of energy harvester for converting these low amplitude vibrations or vibrations generated from other mechanical motions into a meaningful electrical energy depends upon the cost effectiveness, reliability and profile of the harvester. Significantly, also important is to consider the low frequency mechanical output of the hard disk drives that is not in the continuous signal form that can be stored and utilized for continual charging or powering devices on power failure or powering the operations of micro-electronics, micro controllers and processors, especially in datacenters.

Improvising upon the efficiency of energy capture generated in the form of low magnitude local vibrations and converting it into a meaningful electrical energy remains an everlasting challenge. In this light, it will be advantageous to realize an energy harvesting system that could glean ambient power, i.e. power stored in local vibrations and convert this into useful electricity.

OBJECT OF THE INVENTION

In accordance with the present invention, an energy harvesting apparatus capable of converting mechanical vibrations into useful electrical energy is provided.

It is an object of the present invention to provide an energy harvesting apparatus that captures low frequency vibrations from hard disk drives in the datacenters to generate electrical energy for powering micro-controllers or micro electronics or processors; or continually charging USB devices or battery powered devices.

Another objective of the present invention is to provide an energy harvesting mechanism that improves efficiency of energy capture using the piezoelectric energy harvesting apparatus.

It is an object of the invention to provide an energy harvesting apparatus that can convert very low power of magnitude ranging from 70-90 mV into significant voltage of 3-5V.

In another aspect of the present invention, the energy harvesting apparatus generates power from small magnitude and low frequency vibrational sources intrinsic to the environment to provide operating power for a host of various devices.

SUMMARY OF THE INVENTION

The present invention relates generally to the mechanism of capturing small magnitude low frequency vibrational energy from vibrational energy sources and converting it into electrical energy. The electrical energy so obtained is of amplified magnitude and can be directly used for either powering the operations of micro-electronics or micro controllers or processors; continual charging of USB devices; or for storing energy in capacitors or storage batteries for subsequent use by external circuitry.

In one exemplary embodiment, the mechanism of harvesting vibrational energy employs an energy harvesting apparatus comprising of: a three dimensional vibrational energy source that is capable of generating vibrational energy of varying energy characteristics; a vibration sensing device configured to sense the vibrations in response to varying energy characteristics of the vibrational energy source; an electronic amplifier coupled to an Optocoupler for modulating the varying energy characteristics to a first signal form, hereinafter also referred to as first electrical signal form, of an amplified magnitude; and a modulating means in communication with a cascade amplifier for modulating the first signal form to an amplified second signal form, hereinafter also referred to as second electrical signal form. The modulating means of the energy harvesting apparatus further comprises of a pneumatic controller for converting the first signal form to proportional pneumatic stress; and at least one piezoelectric sensor secured to the said pneumatic controller for generating the said second signal form in response to mechanical stress.

In each exemplary embodiment, the output of the energy harvesting apparatus is connected to a diode bridge rectifier and a capacitor for converting the output alternating signal form to a direct current signal form for powering host of various devices. The capacitor further reduces the variations of the rectified signal form received from the diode bridge to generate smoothened waveform.

These and other aspects, features and advantages of the present invention will be described or become apparent from the following detailed description of preferred embodiments, which is to be read in connection with the accompanying drawings.

DETAILED DESCRIPTION OF THE INVENTION

Figure 1:
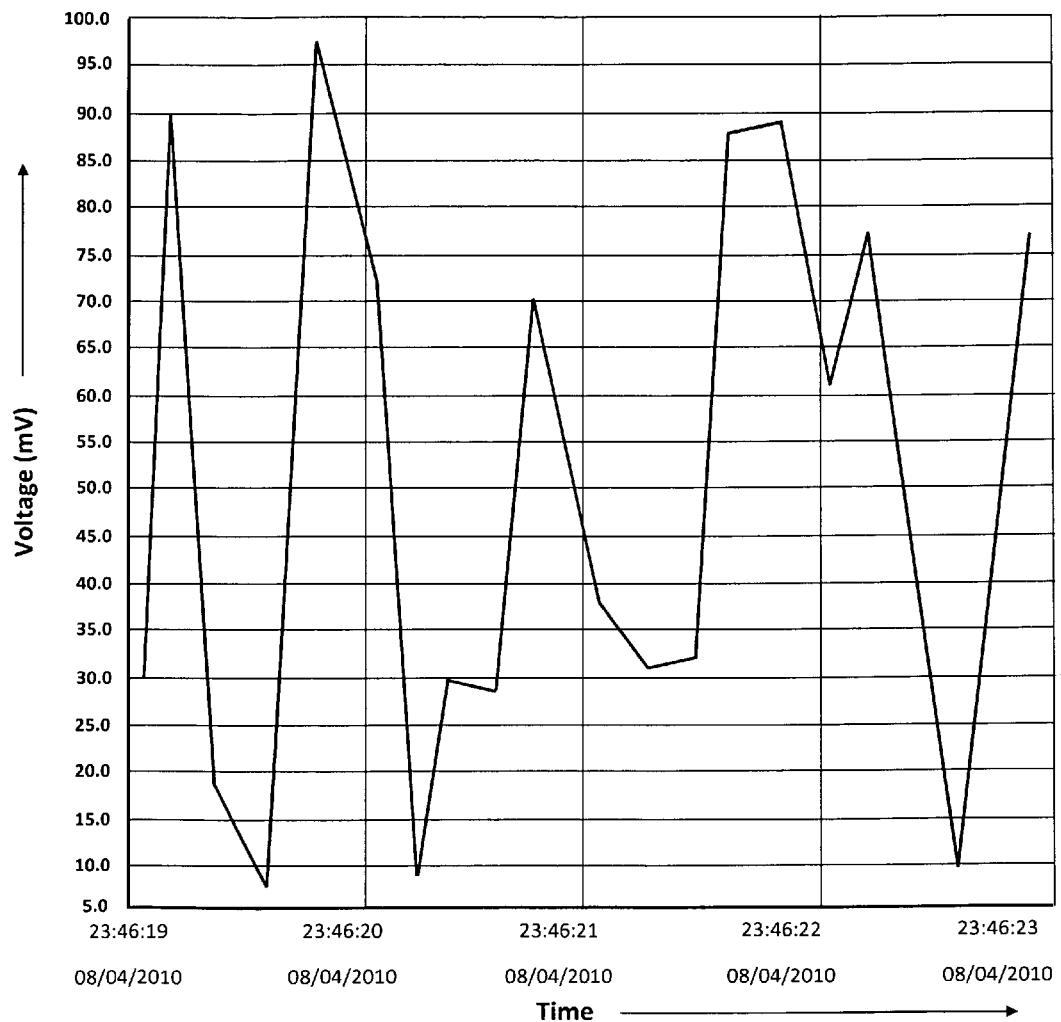
FIGS. 1, 2 and 3 shows vibrational energy characteristics of the vibrations generated during multiple activities performed by a hard disk drive.

Before the present method, system and communication enablement are described, it is to be understood that this invention is not limited to the particular methodologies, and hardware and network described, as these may vary within the specification indicated. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. Further, although the figures may depict example arrangements of elements, additional intervening elements, devices, features, or components may be present in a practical embodiment of the invention.

The present invention is directed to a mechanism of capturing mechanical motions, particularly small magnitude and low frequency vibrations and converting it into a useful electrical form of energy by utilizing an energy harvesting apparatus. The energy harvesting apparatus senses mechanical vibrations generated from a vibrational energy source, like a physical hard disk drive and converts it into a meaningful electrical energy by modulating means that involves an pneumatic controller to apply pneumatic stress upon a piezoelectric sensor to cause necessary deformation of the said element, which in turn, produces the voltage differential across the element. The small magnitude and low frequency vibrations can be produced by a physical disk drive during performance of multiple operations. Though, for the illustrative purposes of the present invention, the low frequency and small magnitude vibrations are considered to be generated by a disk drive, such vibrations can be generated by the operations of any other equipment. Therefore, the energy generated eventually by mechanism of the present invention can be used for diverse applications, like powering of micro-controllers, micro-electronics and processors; for charging of USB devices or powering of other devices on power failure.

Figure 2:
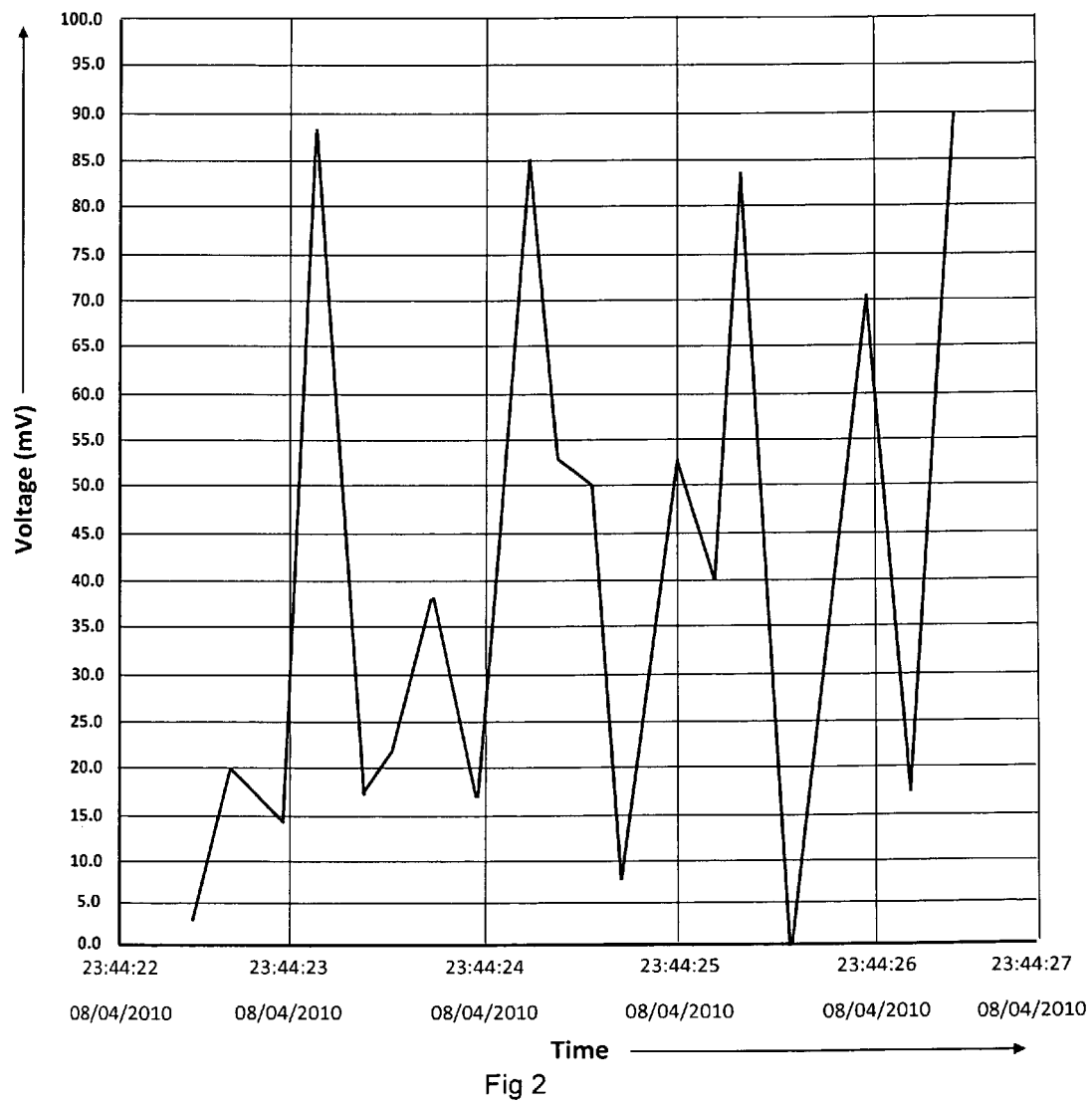
Figure 3:
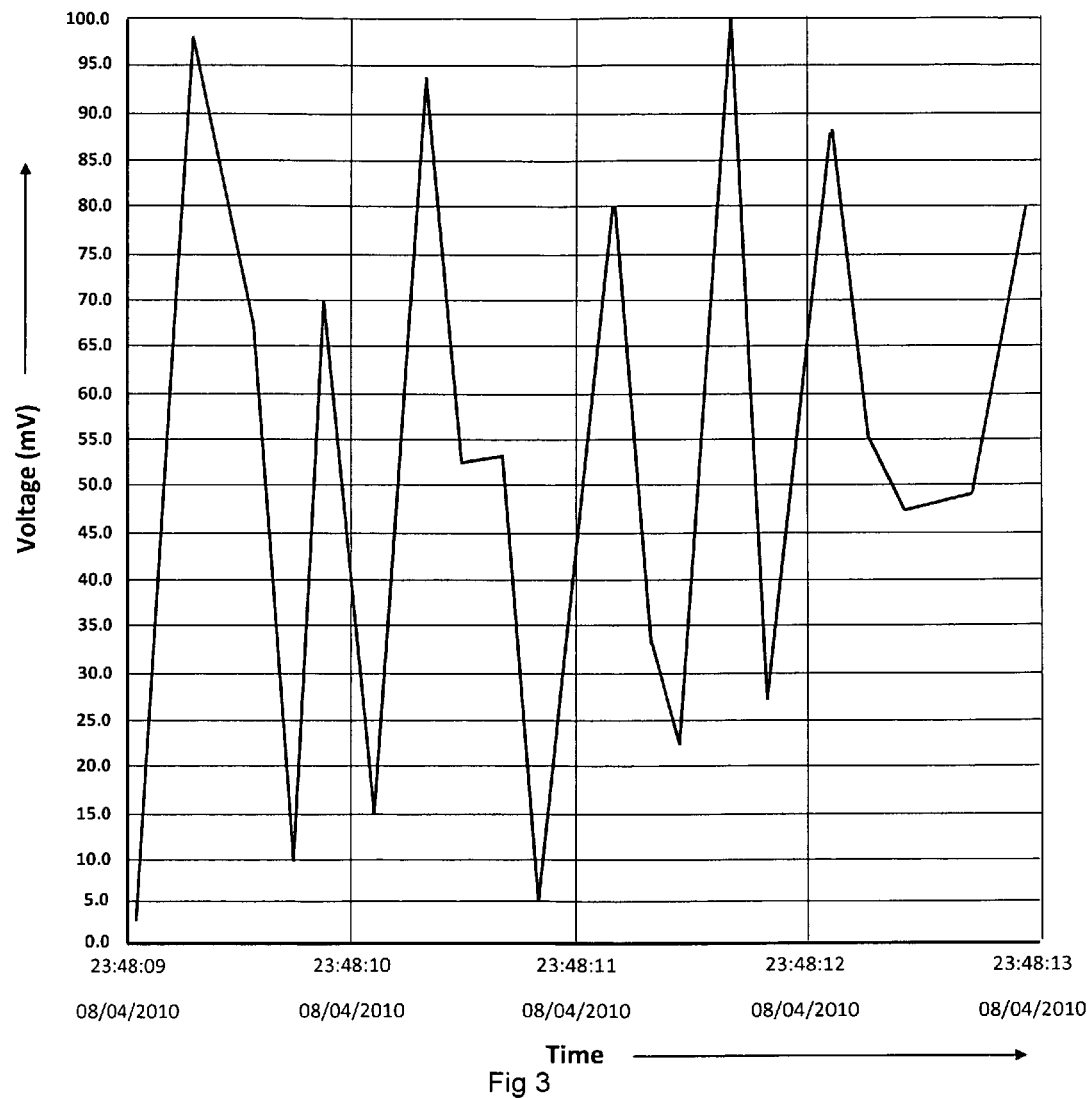

Turning now to FIG. 1, vibrational energy characteristics generated during multiple operations performed on the vibrational energy source is illustrated. Various functional operations performed by/on the hard disk drive may include accessing files from hard disk drives and working on multiple applications which sends read-write operations to hard disk drives; the said activity being capable of generating approximately 90-95 mV of electrical potential difference. Other operations include copying files to hard disk drives that generates voltage differential to the magnitude of 80 mV and also operations like installation of application or during registry whereby a voltage to the tune of 70 mV gets generated (As shown in FIGS. 2 and 3). The vibrational motions produced from hard disk drives are sensed by the vibration sensing device—a sensor that converts them into signals of varying energy characteristics depending upon the operations performed by/on the hard disk drive.

The hard disk drive has very high speed motors and actuators, both of which contribute to the generation of mechanical vibrations. The sensor responsible for sensing these low magnitude vibrations is selected to be of a very high sensitivity that can be used to harvest otherwise wasted energy from these mechanical oscillations. In accordance with one general embodiment of the present invention, a transducer can be employed as a vibration sensing device for desired conversion of energy form. Typically a displacement sensor is capable of measuring such low frequency oscillations with least signal distortions or amplifier overload. The transducer can also be an electrostatic transducer for producing a transducer signal proportional to vibrational motion of the hard disk drive.

Figure 4:
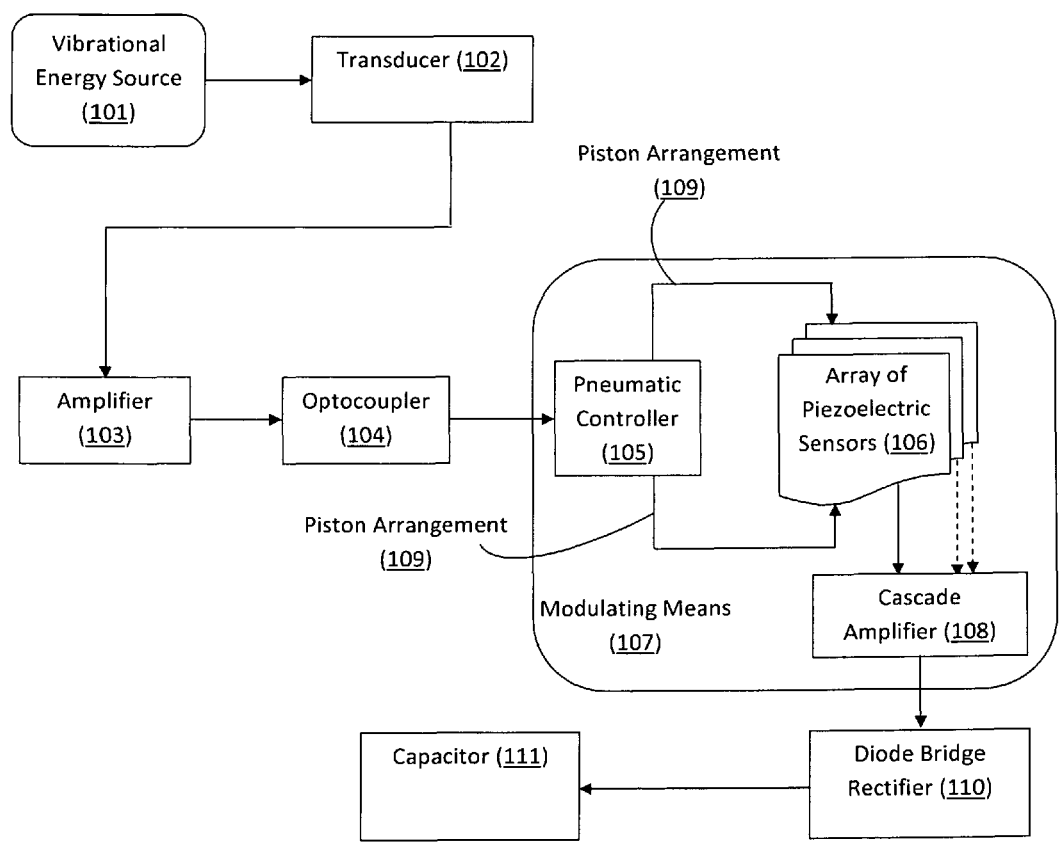
FIG. 4 is a functional block diagram of an energy harvesting apparatus supporting an external circuitry in accordance with one of the preferred embodiments of the present invention.

Referring now to FIG. 4, a functional block diagram of an energy harvesting apparatus in accordance with one of the preferred embodiments of the present invention is illustrated at reference numeral 100. The apparatus 100 includes a hard disk drive 101 as a source of vibrational energy that is typically formed of magnetic disks rotated by spindle motor; plurality of heads placed adjacent to disk bearing elements capable of performing separate read or write operations. The plurality of heads are pivoted on a suspension arm for rotation about single axis whereby the suspension arm is further pivotally mounted to an actuator arm that generates vibrations in all three dimensions by rotating back and forth around its axis.

The head vibrations are sensed by transducer 102 coupled to the suspension assembly of the heads to receive strained vibrations of the head and producing proportional transducer signal. The opposing terminals of the transducer 102 are oriented in a manner to induce voltage signal across the terminals on receiving vibrational modes from any direction. The vibrations of varying energy characteristics are detected and sensed by the transducer for producing transducer signal varying in the range of 70-95 mV. The transducer signal is produced in proportion to the mechanical movement of the head assembly of the hard disk drive 101.

The signal is now amplified by an electronic amplifier 103 that amplifies the control voltage of 70-90 mV to significant sensible voltage of 2-3V that can be fed as an input to the modulating means 107. The electronic amplifier 103 is further coupled to an optocoupler 104 in order to transfer generated transducer signals by utilizing light waves to provide coupling with electrical isolation between its input and output. The optocoupler 104 is an electronic equipment and signal and power transmission lines can be subjected to voltage surges induced by electrostatic discharge, radio frequency transmissions, switching pulses (spikes) and perturbations in power supply.

The transducer signal is a highly distorted square waveform, in the form of spikes, with odd harmonics that cannot be fed directly to the external circuitry. The signals are therefore communicated to the optocoupler 104 that reduces the distortions in the square waveform to form the first signal form. The resulting first signal form is a slightly less distorted square form of amplified magnitude (2-3V) that can be fed as an input to a pneumatic controller 105 which has piston type of arrangement which will move and push to produce desired pneumatic stress on the piezoelectric sensor 106.

The pneumatic controller 105 is capable of producing mechanical deformation (tension, compression and shear) on the piezoelectric sensor 106, whereby the extent of deformation is proportional to the pneumatic stress constant for the direction of applied force. The pneumatic controller 105 has a cylindrical piston type arrangement wherein the piston diameter is preferably chosen in the range of 0.375 inches (9.53 mm) varying up to 1.5 inches (38.1 mm) while the thickness is preferably chosen as 0.008 inches (0.203 mm). The pressure transmitted by the pneumatic controller generates stress upon impact with the piezoelectric sensor 106, which gets depressed and deformed. The stress produced by the pneumatic controller is in the range of 75-100 psi to cause the desired deformation. Then there is generated an electric charge corresponding to this stress which is detected in the form of an electrical signal from the electrodes arranged upon the piezoelectric sensor assembly.

Piezoelectricity is a capability of certain crystalline materials to change their dimensions when subjected to an electrical field or, conversely, to produce electrical signals when mechanically deformed. By combining plurality of sensor elements, a piezoelectric sensor array can be formed. Together, for the purposes of this invention, the combination of pneumatic controller and an array of piezoelectric sensors are defined as the modulating means 107 that is capable of transforming the first signal form received from the optocoupler 104 to the second signal form.

The piezoelectric sensor 106 comprises of piezoelectric element which further comprises of a piezoelectric body and electrodes and electronic leads. The piezoelectric body is preferentially fabricated from noble crystals and certain ceramics. Several types of piezoelectric materials can be employed to fabricate the piezoelectric elements of the desired type, including $BaTiO3$, $Pb(Zr_xTi_{1-x})O3$, $(Na \times K_{1-x})NbO\ 3$, $(Na\ \frac{1}{2}\ Bi\ \frac{1}{2})TiO\ 3$, $(K\ \frac{1}{2}\ Bi\ \frac{1}{2})TiO\ 3$, $Pb(A\ \frac{1}{3}\ B\ \frac{2}{3})O_3$—$PbTiO\ 3$ (where A=Zn, Mg, Ni, and B=Nb, Ta), $Pb(Yb\ \frac{1}{2}\ Nb\ \frac{1}{2})O_3$—$PbTiO_3$, $LiNbO_3$, $AgNbO_3$, and Bi-layered structures. Solid solutions and composite formulations of these materials can also be employed to fabricate the piezoelectric elements. The electronic leads are connected to the electrodes by using any connecting means.

Figure 5:
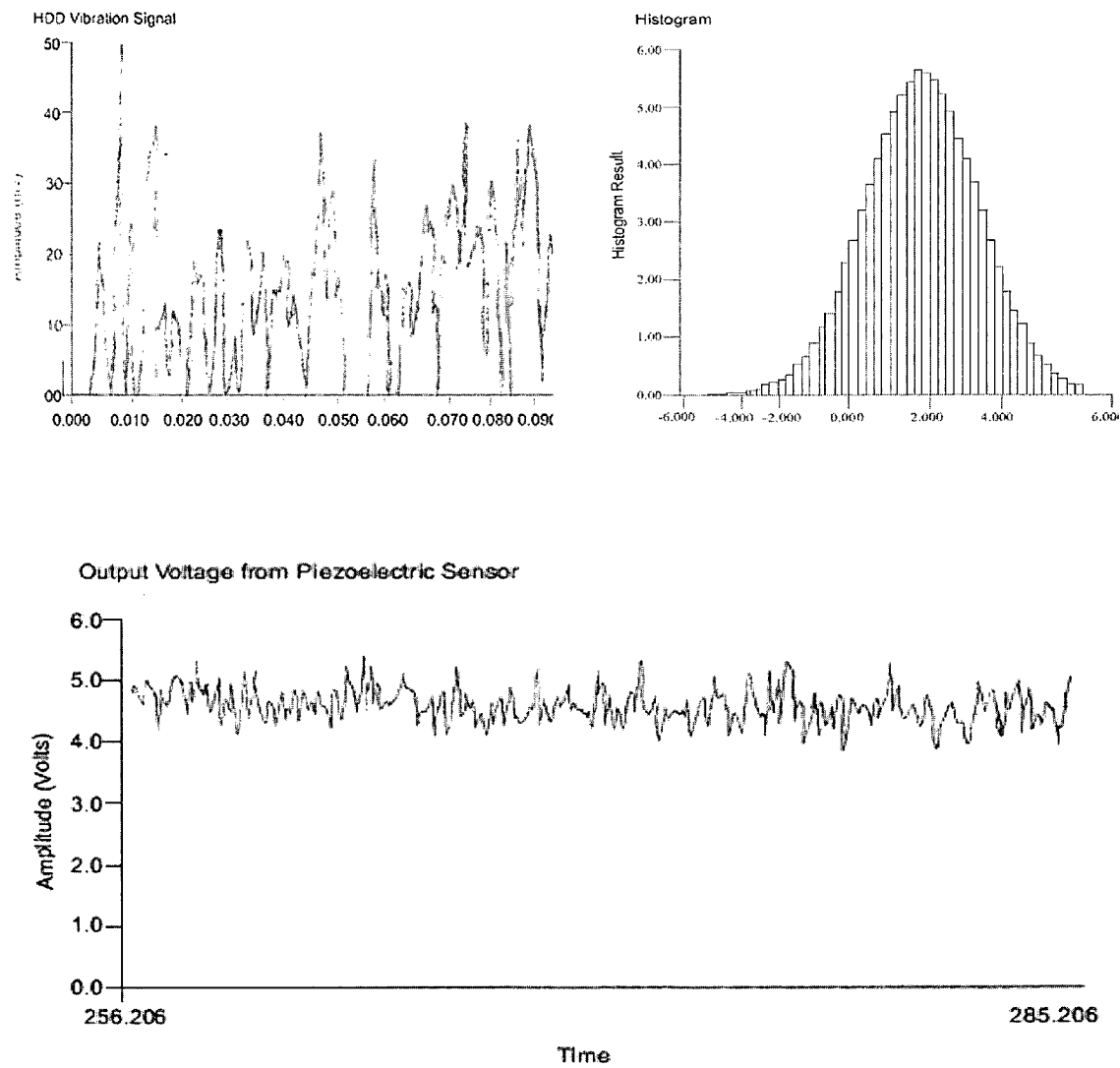
FIG. 5 show alternating waveform appearing as the output from piezoelectric sensor.

The stress generated by the pneumatic controller 105 is generally normal to the axis of the piezoelectric sensor 106 which will tend to bend and strain the element thereby generating a voltage across the element generally in a plane defined by the applied stress and the axis of the element. The voltage waveform, referred herein as the second signal form, and as generated from the piezoelectric sensor is perfect square waveform (smoothened) with very low frequency spikes (as shown in FIG. 5). The modulating means 107 comprising of pneumatic controller 105 and piezoelectric sensor array arrangement 106 is further integrated with a cascade amplifier 108 for amplifying the second signal form to significant voltage of magnitude varying in the range of 3-5V (shown in FIG. 5) which stabilized to form a gain histogram of 3-5V. Each sensor within an array of piezoelectric sensor arrangement is capable of generating 3-5V of meaningful energy that can be either stored in a super capacitor or a lithium-ion battery; or for powering the operations of micro-electronics, micro-controllers or processors; or continual charging of USB devices; or for powering of devices on power failure. Thus, multiple voltage paths can be formed using array arrangement for directing the output electrical energy for multiple purposes. Preferably, one path of the piezoelectric sensor array arrangement is used to power the circuitry of the system which nullifies the input voltage consumption of the circuitry, while the other paths can be used for miscellaneous purposes, discussed above.

The reciprocating motion of the pneumatic controller causes the piezoelectric sensor to produce alternating waveform that is not relatively consistent or continuous and preferably not supplied as a support to external circuitry.

Therefore, the modulating means 107 is further integrated with diode bridge rectifier and a capacitor to convert and utilize the generated second signal form to DC voltage output to support the electrical functioning of an externally associated circuitry. The capacitor further reduces the variations of the rectified signal form received from the diode bridge to generate smoothened waveform. The outputted DC voltage terminals are either connected in series or parallel or series parallel in order to support the electrical functioning of an externally associated circuitry.

Although the present invention has been shown and described with respect to several preferred embodiments thereof, various changes, omissions and additions to the form and detail thereof, may be made therein, without departing from the spirit and scope of the invention.

I claim:
1. A vibrational energy harvesting apparatus comprising:
   a transducer (102) configured to:
   sense vibrational energy generated by a vibrational energy source (101), and
   convert the vibrational energy into a transducer signal, wherein the transducer signal indicates an electrical signal generated in proportion to the vibrational energy;
   an electronic amplifier (103) configured to:
   amplify the transducer signal, wherein the transducer signal amplified is in a form of a distorted square waveform;
   an optocoupler (104) configured to:
   receive the transducer signal in the form of the distorted square waveform, and
   reduce distortions from the amplified transducer signal to generate a first electrical signal form; and
   a pneumatic controller (105) configured to receive the first electrical signal form, wherein the pneumatic controller (105) has a piston arrangement (109) coupled with an array of piezoelectric sensors (106), wherein the pneumatic controller (105) moves and pushes the piston arrangement (109) by using the first electrical signal form in order to generate a pneumatic stress upon each piezoelectric sensor of the array of piezoelectric sensors (106), and wherein
   each piezoelectric sensor generates a second electrical signal form in response to the pneumatic stress, wherein the second electrical signal form is a representative of an electrical energy.

2. The vibrational energy harvesting apparatus of claim 1, wherein the transducer signal is generated, by the transducer (102), of a magnitude varying in a range of 70-95 mV.

3. The vibrational energy harvesting apparatus of claim 1, wherein the electronic amplifier (103) amplifies the transducer signal to a magnitude varying in a range of 2-3V.

4. The vibrational energy harvesting apparatus of claim 1, the vibrational energy harvesting apparatus further comprising:
   a cascade amplifier (108) integrated with the array of piezoelectric sensors (106), wherein the cascade amplifier (108) amplifies the second electrical signal form to a magnitude varying in the range of 3-5V.

5. The vibrational energy harvesting apparatus of claim 1, the vibrational energy harvesting apparatus further comprising:
   a diode bridge rectifier (110) and a capacitor (111), wherein the diode bridge rectifier (110) is configured to convert the second electrical signal form to DC voltage output, and wherein the capacitor (111) is configured to store the DC voltage output.

6. The vibrational energy harvesting apparatus of claim 1, wherein the pneumatic stress generated upon each piezoelectric sensor (106) is in a range of 75 psi-100 psi.

7. The vibrational energy harvesting apparatus of claim 1, wherein the piston arrangement (109) comprises a piston of diameter in a range of 0.375 inches to 1.5 inches, and a thickness of 0.008 inches.

8. The vibrational energy harvesting apparatus of claim 1, wherein the second electrical signal form is generated, by each piezoelectric sensor, in a square waveform of amplitude in a range of 3-5V.

9. The vibrational energy harvesting apparatus of claim 1, wherein the piezoelectric sensor is formed of piezoelectric element selected from a group comprising piezoelectric ceramics, piezoelectric single crystals, piezoelectric polymers, and piezoelectric composites.

10. A method of harvesting energy from a vibrational energy source, the method comprising:
   sensing, by a transducer (102), vibrational energy generated from a vibrational energy source (101);
   converting, by the transducer (102), the vibrational energy into a transducer signal, wherein the transducer signal generated is proportionate to the vibrational energy;
   amplifying, by an electronic amplifier (103), the transducer signal, wherein the transducer signal amplified is in a form of distorted square waveform;
   receiving, by an octocoupler (104), the transducer signal in the form of the distorted square waveform, wherein the octocoupler (104) reduces distortion from the amplified transducer signal to generate a first electrical signal form; and
   receiving, by a pneumatic controller (105) having a piston arrangement (109) coupled with an array of piezoelectric sensors (106), the first electrical signal form, wherein the pneumatic controller (105) moves and pushes the piston arrangement (109), by using the first electrical signal form, in order to generate pneumatic stress upon each piezoelectric sensor of the array of piezoelectric sensors (106), and wherein each piezoelectric sensor generates a second electrical signal form in response to the pneumatic stress, wherein the second electrical signal form is a representative of an electrical energy.

11. The method of claim 10, wherein the transducer signal is generated, by the transducer (102), of a magnitude varying in a range of 70-90 mV.

12. The method of claim 10, wherein the electronic amplifier (103) amplifies the transducer signal to a magnitude varying in a range of 2-3 V.

13. The method of claim 10, wherein the pneumatic stress generated upon the each piezoelectric sensor (106) is in a range of 75 psi-100 psi.

14. The method of claim 10, wherein the second electrical signal form is generated, by each piezoelectric sensor, in a square waveform of magnitude varying from 3-5V.

* * * * *